(12) United States Patent
Imholt et al.

(10) Patent No.: US 8,628,746 B2
(45) Date of Patent: Jan. 14, 2014

(54) SYSTEM AND METHOD FOR DISPERSING NANOSTRUCTURES IN A COMPOSITE MATERIAL

(75) Inventors: Timothy J. Imholt, Richardson, TX (US); James A. Pruett, Allen, TX (US)

(73) Assignee: Raytheon Company, Waltham, MA (US)

( * ) Notice: Subject to any disclaimer, the term of this patent is extended or adjusted under 35 U.S.C. 154(b) by 978 days.

(21) Appl. No.: 12/100,909

(22) Filed: Apr. 10, 2008

(65) Prior Publication Data

US 2009/0042018 A1    Feb. 12, 2009

Related U.S. Application Data

(60) Provisional application No. 60/923,441, filed on Apr. 12, 2007.

(51) Int. Cl.
*B01J 19/14* (2006.01)

(52) U.S. Cl.
USPC ............ 423/445 B; 423/445 R; 252/500; 252/502; 252/510; 252/511; 911/700; 911/701; 911/742; 911/778; 911/842; 911/847

(58) Field of Classification Search
USPC ....... 252/500–511; 423/447.3, 445 B, 445 R; 977/700, 701, 742, 778, 842, 847
See application file for complete search history.

(56) References Cited

U.S. PATENT DOCUMENTS

| | | | |
|---|---|---|---|
| 3,306,835 A | 2/1967 | Magnus | |
| 3,507,938 A * | 4/1970 | Hundsdiecker | ............... 264/439 |
| 5,196,212 A | 3/1993 | Knoblach | |
| 5,298,203 A | 3/1994 | Yoshida et al. | |
| 6,033,198 A | 3/2000 | Furlani et al. | |
| 7,244,373 B1 | 7/2007 | Anazawa et al. | |
| 7,244,374 B2 | 7/2007 | Anazawa et al. | |
| 7,247,670 B2 | 7/2007 | Malenfant et al. | |
| 7,462,498 B2 | 12/2008 | Mao et al. | |
| 7,468,315 B2 | 12/2008 | Buretea et al. | |
| 7,491,428 B2 | 2/2009 | Smits et al. | |
| 7,504,152 B1 | 3/2009 | Siegel et al. | |
| 7,505,250 B2 | 3/2009 | Cho et al. | |
| 2004/0070326 A1* | 4/2004 | Mao et al. | ............... 313/311 |

(Continued)

FOREIGN PATENT DOCUMENTS

| | | | |
|---|---|---|---|
| EP | 1 077 341 A2 | 2/2001 | ............... F16L 9/12 |
| JP | 2006-057129 | 3/2006 | |

(Continued)

OTHER PUBLICATIONS

Martin et al. ("Electric field-induced aligned multi-walled carbon nanotube networks in epoxy composites." Polymer. vol. 46, pp. 877-886, Dec. 15, 2004.*

(Continued)

*Primary Examiner* — Tri V Nguyen
(74) *Attorney, Agent, or Firm* — Cantor Colburn LLP

(57) ABSTRACT

According to one embodiment, a composite material includes nanostructures dispersed in a substrate that may be cured from an amorphous state to a hardened state. The composite material may be manufactured by placing the nanostructures in the substrate while in an amorphous state and applying an electric field to the nanostructures and the substrate while the substrate cures to a hardened state.

3 Claims, 2 Drawing Sheets

(56) References Cited

U.S. PATENT DOCUMENTS

| | | | |
|---|---|---|---|
| 2004/0099438 A1* | 5/2004 | Arthur et al. | 174/257 |
| 2004/0126526 A1 | 7/2004 | Parsonage et al. | 428/36.91 |
| 2004/0180244 A1* | 9/2004 | Tour et al. | 429/13 |
| 2005/0116336 A1 | 6/2005 | Chopra et al. | |
| 2005/0238810 A1 | 10/2005 | Scaringe et al. | |
| 2005/0275144 A1 | 12/2005 | Muhe et al. | |
| 2005/0287064 A1 | 12/2005 | Mayne et al. | |
| 2006/0115640 A1* | 6/2006 | Yodh et al. | 428/221 |
| 2006/0275371 A1 | 12/2006 | Dai et al. | |
| 2007/0129481 A1 | 6/2007 | Yamaguchi et al. | |
| 2008/0176052 A1 | 7/2008 | Ma et al. | |
| 2008/0202341 A1* | 8/2008 | Poole et al. | 96/6 |

FOREIGN PATENT DOCUMENTS

| | | | | |
|---|---|---|---|---|
| WO | WO 00/34379 | | 6/2000 | C08K 9/04 |
| WO | WO 03/016048 A1 | | 2/2003 | B32B 18/00 |
| WO | WO 2005/056645 A1 | | 6/2005 | C08K 3/04 |
| WO | 2005/075571 A1 | | 8/2005 | |
| WO | WO2006082436 | * | 8/2006 | B01D 53/14 |
| WO | WO 2006/104822 A2 | | 10/2006 | C08K 3/00 |

OTHER PUBLICATIONS

Koerner et al. "Tuning polymer nanocomposite morphology: AC electric field manipulation of Epoxy-monmorllonite (clay) suspensions." Adv. Mater. Vo. 16, pp. 297-302, Feb. 17, 2004.*

Zhu et al. (Improving the dispersion and integration of single walled carbon nanotubes in epoxy composites through functionalization. NanoLetters. vol. 3, pp. 1107-1113, Jun. 26, 2003).*

U.S. Appl. No. 12/152,642, entitled "System and Method of Dispersion of Nanostructures in Composite Materials," 26 pages, filed May 14, 2008.

Notification of Transmittal of the International Search Report and the Written Opinion of the ISA, or the Declaration, for PCT/US2008/060027 (14 pages), Sep. 18, 2008.

U.S. Appl. No. 11/830,938 entitled, "Aligning Nanomaterial in a Nanomaterial Composite", 23 pages specification, claims and abstract, 3 pages of drawings, inventors Timothy J. Imholt, et al., filed Jul. 31, 2007.

U.S. Appl. No. 11/830,970 entitled, "Making a Nanomaterial Composite", 25 pages specification, claims and abstract, 3 pages of drawings, inventor Timothy J. Imholt, filed Jul. 31, 2007.

USPTO, Nonfinal Office Action for U.S. Appl. No. 11/830,938, Sep. 17, 2010.

USPTO, Nonfinal Office Action for U.S. Appl. No. 11/830,938, Nov. 10, 2010.

USPTO, Nonfinal Office Action for U.S. Appl. No. 11/830,970, Sep. 23, 2010.

USPTO, Final Office Action for U.S. Appl. No. 11/830,970, Mar. 15, 2011.

Bai, J.B., et al., "*Effect of the length and the aggregate size of MWNTs on the improvement efficiency of the mechanical and electrical properties of nanocomposites—experimental investigation*", Composites: Part A 34 (2003), Elsevier, www.elsevier.com/locate/composites, pp. 689-694.

Harris, C., et al., "*The effect of changing nanotube length on the performance of single walled nanotubes polymer photovoltaic devices*", pp. 144-146, 2003.

Ras, Robin H.A., et al., "*Hollow Inorganic Nanospheres and Nanotubes with Tunable Wall Thicknesses by Atomic Layer Deposition on Self-Assembled Polymeric Templates*", Advanced Materials, 2007, 19, pp. 102-106.

USPTO, Final Office Action for U.S. Appl. No. 11/830,938, 15 pages, Apr. 13, 2011.

USPTO, Advisory Action for U.S. Appl. No. 11/830,970, 3 pages, May 24, 2011.

* cited by examiner

SYSTEM AND METHOD FOR DISPERSING NANOSTRUCTURES IN A COMPOSITE MATERIAL

RELATED APPLICATIONS

This patent application claims priority from Provisional Patent Application Ser. No. 60/923,441, filed Apr. 12, 2007, and entitled SYSTEM AND METHOD FOR DISPERSING NANOSTRUCTURES IN A COMPOSITE MATERIAL.

TECHNICAL FIELD OF THE DISCLOSURE

The present disclosure relates generally to nanostructures, and more particularly, to a system and method for dispersing nanostructures in a composite material.

BACKGROUND OF THE DISCLOSURE

Composite materials generally refer to substances that have been engineered from two or more constituent materials with significantly different sets of properties. One of the constituent materials may be a substrate that exists in a fluid-like, viscous form until cured to a hardened state, such as an epoxy adhesive. To enhance particular characteristics of the cured substrate, one or more other constituent materials may be added. These constituent materials may remain separate and distinct from the substrate while in fluid form. When cured, the resulting composite material may have properties in which the constituent materials act in some kind of cooperative fashion to cause the composite material to have advantageous overall properties.

SUMMARY OF THE DISCLOSURE

According to one embodiment, a composite material includes nanostructures dispersed in a substrate that may be cured from an amorphous state to a hardened state. The composite material may be manufactured by placing the nanostructures in the substrate while in an amorphous state and applying an electric field to the nanostructures and the substrate while the substrate cures to a hardened state.

Some embodiments of the present disclosure may provide numerous technical advantages. A particular technical advantage of one embodiment may be to provide relatively enhanced distribution of nanostructures in a composite substrate using electrophoresis. Electrophoresis generally refers to a process whereby movement of electrically charged materials are provided by an electric field. The electrophoresis process causes nanostructures immersed within the substrate to disperse throughout the substrate by aligning along an electric field. Many known nanostructure dispersion techniques introduce various chemical formulations into the substrate for dispersion of nanostructures. These chemical formulations may harm the resulting hardened composite material. The electrophoresis process according to the teachings of the present disclosure, however, may be generally non-invasive to the substrate during cure and does not introduce chemical impurities that may cause adverse affects.

While specific advantages have been disclosed hereinabove, it will be understood that various embodiments may include all, some, or none of the previously disclosed advantages. Other technical advantages may become readily apparent to those skilled in the art of composite materials.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

Nanostructures have unique properties when compared with conventional materials. A nanostructure generally refers to a structure having at least one dimension that is between 1 and 100 nanometers. For reference, a hydrogen atom is approximately 0.1 nanometer in physical size. Structures in this size range typically have some property or set of properties that larger structures, even though made from the same atomic species, may not possess. A structure will usually not be referred to as a nanostructure unless one of its three dimensions is in the nanoscale range. That is, to be classified as a nanostructure, two dimensions of the structure may be outside the range of 1 to 100 nanometers while one dimension is within this range.

Known carbon nanostructure dispersion techniques in composite material have been problematic. This may be due to the fact that nanostructures have relatively strong forces binding them together. It has been shown that nanostructures, such as carbon nanotubes, will tend to clump together in a substrate that has a fluid consistency. In the past, several differing approaches have been taken with nanocomposite materials in order to achieve dispersion. The first of these is by extrusion. The problem with extrusion, however, is that the tube structure of the carbon nanotubes are often broken, thus changing the properties of the resulting composite material. The properties affected may include strength, response to electro-magnetic energy, and electrical conductivity. Another known approach to dispersion is by functionalization of the carbon nanotube prior to dispersion in the substrate. This is a process that hooks other atoms such as fluoride atoms to the nanostructures. This allows for easier dispersion, but may also change the properties of the nanotubes to the detriment of the newly engineered material.

Integration of nanostructures, such as nanotubes, into composite materials may provide numerous benefits. The difficulty in forming these composite materials, however, has been that the nanostructures will not disperse easily in a substrate.

Figure 1A:
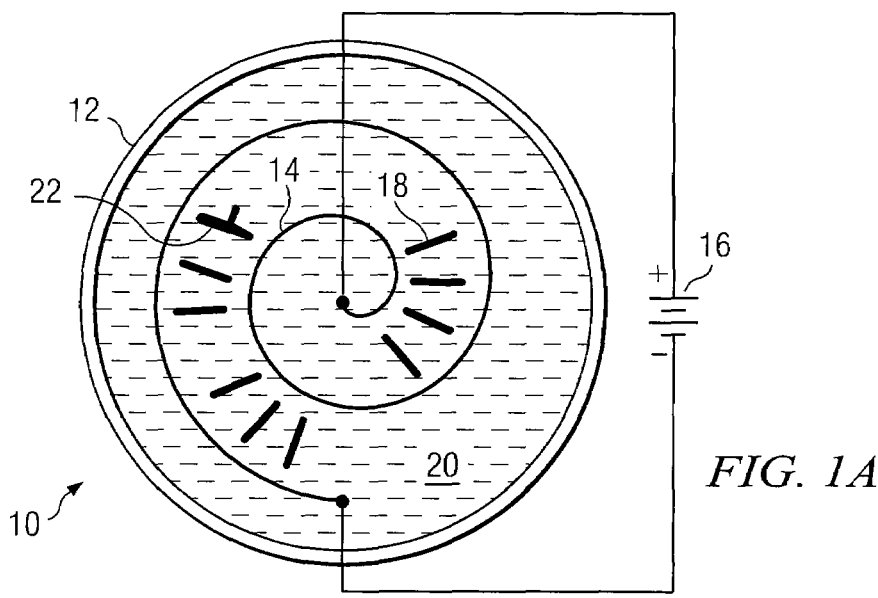
FIG. 1A is a plan view of one embodiment of a nanostructure dispersion system according to the teachings of the present disclosure.

FIG. 1A shows one embodiment of a nanostructure dispersion system 10 that may be used to evenly disperse nanostructures in a composite material. Nanostructure dispersion system 10 generally includes a vessel 12 configured with an electrode 14 that is coupled to an electrical source 16, such as a battery. When a number of nanostructures 18 are immersed in a substrate 20, an electric field 22 formed through the electrode 14 causes nanostructures 18 to be dispersed in a generally even manner within the substrate 20.

In the particular embodiment shown, vessel 12 has a cup-like structure with circular shaped sidewalls 24 for the containment of substrate 20 while in the amorphous state. Other vessels having any suitable concave depression for temporary containment of substrate 20 and nanostructures 18 may be used. For example, a particular vessel may have a relatively complex shape of an article such that substrate 20 cures to the shape of an article of manufacture while in its respective vessel. As another example, a vessel have rectangular-shaped sidewalls for enhanced control of electric field 22 gradients through the substrate 20/nanostructure 18 matrix.

Dispersion of the nanostructures 18 throughout the substrate 20 in a generally even manner may be provided by a process commonly referred to a electrophoresis. Electrophoresis is the movement of an electrically charged substance under the influence of an electric field. Electric field 22 causes nanostructures 18, which may be conductive or semiconductive, to align along this electric field 22 and thereby disperse evenly throughout the substrate 20. Electric field 22 may have a magnitude in the range of approximately 3 volts/centimeter to 36 volts/centimeter. Electric fields in this range may provide sufficient dispersion in substrate 20 while not unduly overheating nanostructures 18. In one embodiment, electric field 22 may be maintained in the range of approximately 6 volts/centimeter to 9 volts/centimeter.

Figure 1B:
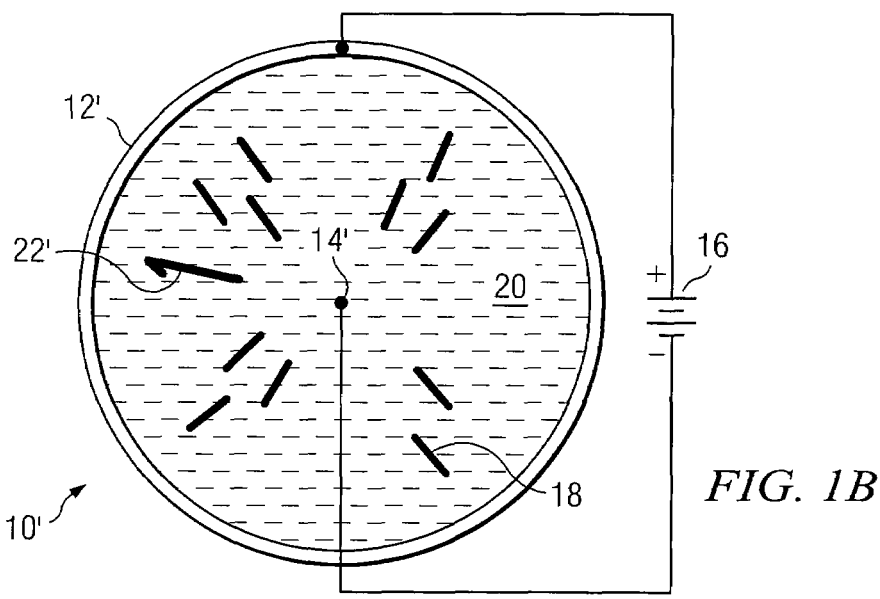
FIG. 1B is a plan view of another embodiment of a nanostructure dispersion system according to the teachings of the present disclosure.

FIG. 1B shows another embodiment of a nanostructure dispersion system 10' that may benefit from the teachings of the present disclosure. The embodiment of FIG. 1B differs from the embodiment of FIG. 1A in that the positive terminal of the electrical source 16 is coupled to the sidewall 24 of the vessel 12', which in this case is generally conductive to electricity. The negative terminal of the electrical source 16 is coupled to an electrode 14' centrally disposed in the vessel 12' such that an electric field 22' is created that is aligned radially with respect to the central portion of the vessel 12'. Thus, the nanostructures 18 may be generally aligned throughout the substrate 20 in a corresponding radial fashion. This particular embodiment describes the positive terminal of electrical source 16 coupled to the sidewall 24 and the negative terminal of the electrical source coupled to electrode 14'. In other embodiments, the negative terminal of electrical source 16 may be coupled to the sidewall 24 and the positive terminal of the electrical source coupled to electrode 14'.

Figure 2A:
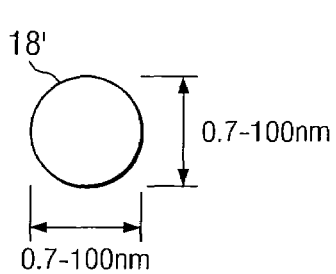
FIG. 2A is an illustration of an end view of a nanotube that may be used with the nanostructure dispersion system of FIG. 1A or 1B.
Figure 2B:
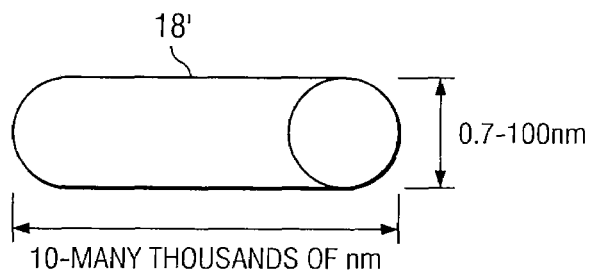
FIG. 2B is an illustration of a side view of the nanotube of FIG. 2A.

FIGS. 2A and 2B show various dimensional characteristics of a particular type of nanostructure 18 referred to as a nanotube 18'. Nanotubes 18' of this type may be referred to as single-walled nanotubes (SWNTs). Nanotubes 18' are generally cylindrical in shape, having a diameter of approximately 0.7 to 100 nanometers and whose length may extend from 10 to over thousands of nanometers. Carbon nanotubes (CNT) are one of the increasing varieties of nanotubes 18' developed and currently available on the commercial market. In general they have the common property that they generally are formed of carbon atoms into a cylindrical shape.

One particular aspect of carbon nanotubes that may provide benefit to many applications is that the carbon-carbon bonds of a carbon nanotube may be described by a type of orbital hybridization which is a form of applied quantum chemistry. The bonds between the atoms of a carbon nanotube are $sp^2$ bonds which are generally known to be a stronger bond than $sp^3$ bonds found in diamond. Many of the theories surrounding nanotubes 18', in fact, come from quantum mechanics and not the more classical sciences which expand the application areas of these nanostructures even further. This is thought widely to be due to both the unique chemistry in addition to the quantum level physical sizes of these structures.

Figure 3:
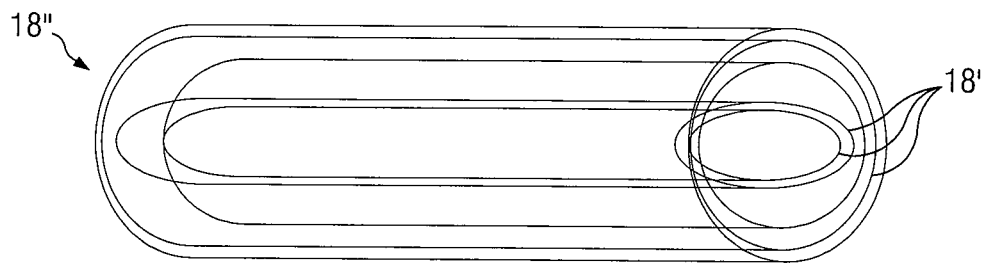
FIG. 3 is an illustration of a side view of a multi-walled carbon nanotube that may be used with the nanostructure dispersion system of FIG. 1A or 1B.

FIG. 3 shows another type of nanotube 18' referred to a multi-walled nanotube (MWNT) 18". Multi-walled nanotube 18" that may be characterized by layers of nested carbon nanotubes. The multi-walled carbon nanotube 18" may include a number of graphite tubes nested within one another. The number of layers can range from 2 to many layers. The distance between the nested nanotubes 18' is approximately the same as the distance between graphene layers in the more commonly found allotrope of carbon. It is this inter-layer distance that gives multi-walled carbon nanotubes 18" roughly the same electrical conductivity as graphene. Two types of multi-walled carbon nanotubes 18" may include a double walled carbon nanotube (DWNT) and a triple-walled carbon nanotube (TWNT).

Most single-walled carbon nanotubes 18' have diameters in the range of 1 to 2 nanometers. The length of these single-walled nanotubes 18' can be many thousands or tens of thousands of times longer than its diameter giving these tubes the potential to have enormously large aspect ratios. In one embodiment, single-walled carbon nanotubes 18' may be a "zig-zag," "armchair," or "chrial" single-walled carbon nanotube 18' based upon how it is constructed.

Single-walled carbon nanotubes 18' and multi-walled carbon nanotubes 18" may be generally conductive or semiconductive to electricity. According to the teachings of the present disclosure, this conductivity may be used to cause alignment of the nanostructures in substrate 20 in a generally even manner while in the presence of electrical field 22. Due to their high degree of structural symmetry and the underlying electronic nature, the manner in which the nanotube 18' is rolled up along the individual graphene planes strongly affects its electrical properties. Single-walled carbon nanotubes 18' can be either conducting or semiconducting. Non-carbon types of nanotubes 18' may be either conducting or semiconducting. All armchair nanotubes 18', for instance, are electrically conducting. Thus, single-walled carbon nanotubes 18' and/or multi-walled carbon nanotubes 18" described above may be used with the nanostructure dispersions system 10 if they possess sufficient conductivity to be manipulated by the electric field 22 of the electrode 14. In one embodiment, nanotubes 18' may have a higher degree of conductivity than the substrate 20 into which they are immersed. In this manner, electric field 22 may develop forces sufficient to disperse nanotubes 18' throughout substrate 20.

Carbon nanotubes 18' may provide a material that is relatively strong and stiff, in terms of tensile strength and elastic modulus. This high strength may be provided by the covalent $sp^2$ bonds which form between the individual carbon atoms in carbon nanotubes 18'. In fact, carbon nanotubes 18' may have tensile strengths as high as 63 Giga-Paschal (GPa). For a point of reference, high-carbon steel has a tensile strength of 1.2 Giga-Paschal (GPa), approximately 1.9% of carbon nanotubes 18'. Carbon nanotubes 18' are also known to have very high elastic modulus, measured to be approximately 1 Tera-Paschal (TPa). Given the low density of carbon nanotubes, which may be approximately 1.3 to 1.4 g/m³, their specific strength may be relatively good.

Under very large tensile loads carbon nanotubes 18' may undergo plastic deformation before breaking. Plastic deformation refers to a type of permanent deformation. Reports of this deformation show it begins at 5% of the total strain energy. When the tube is eventually placed under enough strain, the tube will break and release this energy in the form of heat.

Carbon nanotubes 18' may not be as strong under a compressive load as they are under a tensile load. This may be due to their hollow structure and generally high aspect ratio. When placed under a high compressive load, torsional load, or bending stress, carbon nanotubes 18' tend to undergo buckling. As an additive in substrates 20, such as epoxy, however, they have been shown to increase tensile strength. If kept at proper loading, the composite materials formed from these nanostructures have shown no detriment to compressive properties. All of these properties may be possible in larger composite structures if adequate dispersion of the nanotubes 18' is achieved.

One particular characteristic of nanotubes 18' is the accumulation of a number of these nanotubes 18' into clusters that may be commonly referred to as "nanotube ropes." These nanotube ropes may accumulate together and may be held together with a Van derwaals force equivalent to 0.5 electron-volts/nanometer (eV/nm). This force may add to the overall strength of the nanotube rope. As nanotubes 18' exist mostly as nanotube ropes, the characteristics of nanotubes 18' configured in the nanotube rope must be considered, such as the induced dipole moment of the Van derWalls force.

Although the system 10 has been described utilizing nanotubes 18' made of carbon, other constituent materials may also be implemented with the teachings of the present disclosure. Nanotubes 18' with exceptional strength and electrical properties have been formed from other base atoms as well. Examples of other nanotubes 18' may include, for example, boron nitride and copper sulfide. Some properties of boron nitride nanotubes 18' may be advantageous. For example, all boron nitride nanotubes 18' are known to be semiconductors with a bandgap of approximately 4 electron-volts (eV) and a Young's modulus of approximately 1.18 Tera-Paschals (TPa), which rivals that of carbon nanotubes 18'. The way a well dispersed composite material would be formed is the same as the process described for the carbon nanotube 18' above provided an electric field sufficient to overcome the bandgap were used in the electrophoresis process.

Substrate 20 may be any suitable constituent material having a fluid consistency that may be cured from an amorphous state to a hardened state. In one embodiment, substrate 20 may be any adhesive, such as epoxy, acrylic, or polyurethane. Epoxy is one type of material commonly formed into a composite material. Epoxy is generally a thermosetting epoxide polymer that cures when mixed with a catalyzing agent usually referred to as a hardener. When epoxy is mixed with the appropriate catalyst, the resulting reaction is typically exothermic. The oxygen atom in the epoxy is moved and a material with a high stress tolerance is formed. The resulting cured material by itself, tends to be relatively hard and fairly brittle. However, when nanostructures 18 are dispersed within in the epoxy in a generally even manner, the resulting cured composite material may possess enhanced structural characteristics.

Figure 4A:
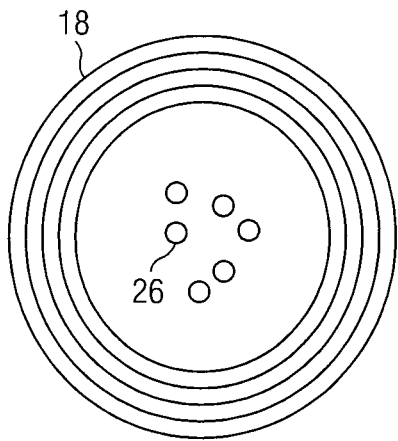
FIG. 4A is an illustration of an end view of a multi-walled carbon nanotube showing several atoms that have been absorbed by the multi-walled carbon nanotube.
Figure 4B:
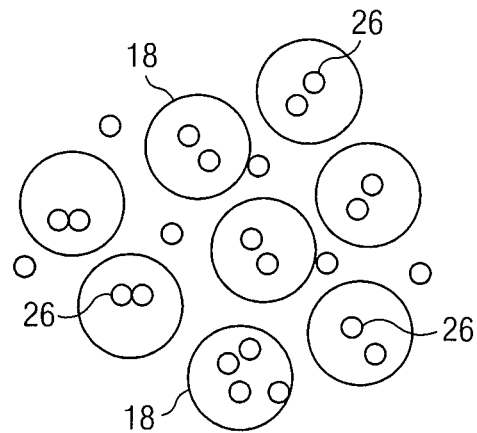
FIG. 4B is an illustration of an end view of several single-walled carbon nanotubes showing several atoms that have been absorbed and adsorbed by the multi-walled carbon nanotube.

FIGS. 4A and 4B illustrate end views of a multi-walled nanotube 18" and several single-walled nanotubes 18', respectively. In one embodiment, the nanotubes 18' may be immersed in water and subsequently evaporated from nanotubes 18' prior to immersion in substrate 20. Immersion in water may cause nanotubes 18' to become more easily dispersed throughout substrate 20. In certain embodiments, evaporating water in the presence of carbon nanotubes 18' may cause adsorption and/or absorption of oxygen and/or hydrogen atoms 26 to the nanotubes 18'. Adsorption generally refers to adhesion of oxygen and/or hydrogen atoms to the surface while absorption refers to assimilation of oxygen and/or hydrogen atom to the inner portion of nanotubes 18'.

FIG. 4A illustrates several oxygen and/or hydrogen atoms 26 that are absorbed in a multi-walled nanotube 18". FIG. 4B illustrates oxygen and/or hydrogen atoms 26 that are absorbed as well as adsorbed to several single-walled nanotubes 18'. The structural properties of nanotubes 18', may aid in the addition of gaseous material, such as oxygen and/or hydrogen, due to immersion in water. For instance, nanotubes 18' have a hollow cavity that is known to be fillable with a variety of gaseous and solid atomic species. In certain embodiments, the nanotubes 18' may swell in size in the presence of water. Using nanotubes 18' that have been altered in size may provide for enhanced dispersion in substrate 20. Immersion in water may also benefit other structural properties of nanotubes 18'. When electrophoresis begins, nanostructures 18 may build up an electrical charge, which may cause nanotubes 18' to become heated. The heating of the nanotubes 18' may cause the oxygen and/or hydrogen atoms 26 to outgas from the nanostructures. This outgassing, in turn, causes pockets of gas in the substrate 20 to form that promote free movement of nanotubes 18' in substrate 20.

In one embodiment, water used for immersion of nanotubes 18' may be distilled water. Other types of water, such as tap water, may contain electrically charged isotopes or other minerals that may bind with nanotubes 18' during immersion. These isotopes or minerals may form an attraction to isotopes bound to other nanotubes 18' to adversely affect dispersion of nanotubes 18' in substrate 20.

Starting as a random mixture of nanotubes 18', electric field 22 disperses and at least partially aligns nanotubes 18'. In some cases, this may be done over large areas of substrate 20 while keeping relatively uniform dispersion. Dispersion of the nanotubes 18' in substrate 20 may be described by a principle referred to electrophoresis. Electrophoresis is governed by the following set of equations. The Lorentz force (F) is:

$$F=qE$$

Where:
q is the charge carried by the body under movement; and
E is the electric field.

Electrophoretic migration may be countered by forces of friction. How quickly materials migrate may be proportional to and uniform in a constant and homogeneous electric field as shown by the following equation:

$$F=vf$$

Where:
F is a force necessary to overcome friction;
v is the velocity of movement; and
f is the coefficient of friction.

Associating the two previous equations provides:

$$qE=vf$$

The electrophoretic mobility (u) of a substance is given by:

$$\mu=v/E=q/f$$

This is a general, simplified equation applying only to non-conductive idealized matrices. More specifically this mobility may be given by the following:

$$\mu = (\epsilon \epsilon_0 \zeta)/\eta$$

Where:
$\epsilon$ is the dielectric constant of the liquid;
$\epsilon_0$ is the permittivity of free space;
$\zeta$ is the surface potential of the particle (additive in the composite); and
$\eta$ is the viscosity of the liquid.

Figure 5:
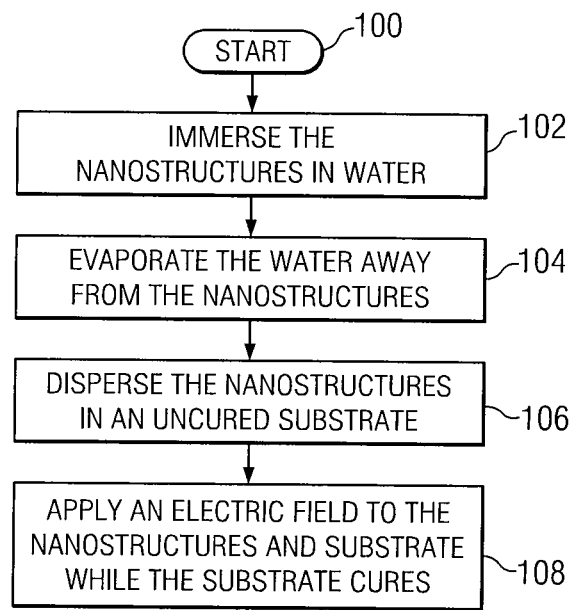
FIG. 5 is a flowchart showing several actions that may be taken to disperse nanostructures in a composite material.

FIG. 5 shows a series of actions that may be performed to manufacture a composite material having relatively evenly dispersed nanostructures 18. In act 100, the process is initiated. In act 102, the nanostructures 18 are immersed in water. In act 104, the water is evaporated away from the nanostructures 18. In one embodiment, the water may be evaporated away from the nanostructures 18 by boiling the water/nanostructure 18 solution. In act 106, the nanostructures 18 are dispersed in a substrate, such as epoxy, while in the amorphous state. In act 108, an electric field 22 is applied to the nanostructures 18 and substrate 20 while the substrate 20 cures to a hardened state. In act 110, the process is complete and the hardened composite material may be used in a normal manner.

Although the present disclosure describes several embodiments, a myriad of changes, variations, alterations, transformations, and modifications may be suggested to one skilled in the art, and it is intended that the present disclosure encompass such changes, variations, alterations, transformation, and modifications as they fall within the scope of the appended claims.

What is claimed is:

1. A method for manufacturing a composite material comprising:
    adsorbing a plurality of gas particles onto a plurality of carbon nanotubes by:
        immersing the plurality of carbon nanotubes in water; and
        evaporating the water from the plurality of carbon nanotubes;
    after adsorbing the plurality of gas particles onto the plurality of carbon nanotubes, placing the plurality of carbon nanotubes in an epoxy glue white the epoxy glue is in an amorphous state; and
    aligning the plurality of carbon nanotubes by outgassing the plurality of gas particles from the plurality of carbon nanotubes by applying an electric field in the range of 3 volts/centimeter to 36 volts/centimeter to the plurality of carbon nanotubes and the epoxy glue while the epoxy glue cures to a hardened state.

2. The method of claim 1, wherein the plurality of carbon nanotubes in the substrate comprises a plurality of single-walled carbon nanotubes.

3. The method of claim 1, wherein the plurality of carbon nanotubes in the substrate comprises a plurality of multi-walled carbon nanotubes.

\* \* \* \* \*